United States Patent
Gao et al.

(10) Patent No.: US 8,994,639 B2
(45) Date of Patent: Mar. 31, 2015

(54) LED BACKLIGHT DRIVING CIRCUIT, BACKLIGHT MODULE, AND LCD DEVICE

(75) Inventors: Xinming Gao, Shenzhen (CN); Xiang Yang, Shenzhen (CN); Fei Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 102 days.

(21) Appl. No.: 13/518,429

(22) PCT Filed: May 21, 2012

(86) PCT No.: PCT/CN2012/075788
§ 371 (c)(1),
(2), (4) Date: Jun. 22, 2012

(87) PCT Pub. No.: WO2013/170490
PCT Pub. Date: Nov. 21, 2013

(65) Prior Publication Data
US 2013/0307878 A1    Nov. 21, 2013

(30) Foreign Application Priority Data

May 16, 2012  (CN) .......................... 2012 1 0151814

(51) Int. Cl.
*G09G 3/36* (2006.01)
*G09G 3/34* (2006.01)
*H05B 33/08* (2006.01)

(52) U.S. Cl.
CPC .......... *G09G 3/3406* (2013.01); *H05B 33/0812* (2013.01); *H05B 33/0815* (2013.01);
(Continued)

(58) Field of Classification Search
CPC ................................... G09G 3/36; G09G 5/10
USPC .......................... 345/102, 690; 315/192, 193
See application file for complete search history.

(56) References Cited

U.S. PATENT DOCUMENTS 7,012,412 B2 * 3/2006 Kanamori et al. ............ 323/283
7,646,989 B2 * 1/2010 Kato .............................. 398/197
(Continued)

FOREIGN PATENT DOCUMENTS

CN     1617195 A    5/2005
CN     1779749 A    5/2006
(Continued)

OTHER PUBLICATIONS

Duan Keyu, the International Searching Authority written comments, Feb. 2013, CN.

*Primary Examiner* — Pegeman Karimi
(74) *Attorney, Agent, or Firm* — IPro, Inc.; Na Xu

(57) ABSTRACT

The invention provides an LED backlight driving circuit, a backlight module, and an LCD device. The LED backlight driving circuit includes an LED light string; an input end of the LED light string is directly connected with an input end of a power source, and an output end of the LED light string is coupled with a buck module. In the invention, because the output end of the LED light string is in series connected with the buck module, the LED light string is connected in series between an input voltage and an output voltage, and a part of LEDs are directly supplied by the input voltage without the first stage conversion. Thus, the energy supplied by the buck module is reduced, the conversion efficiency is improved, the energy efficiency is increased, the requirement of the buck module to withstand voltage is reduced, and the device standard is decreased, thereby favoring cost reduction.

15 Claims, 2 Drawing Sheets

(52) U.S. Cl.
CPC ................. *G09G2320/0606* (2013.01); *G09G 2320/0633* (2013.01); *G09G 2330/00* (2013.01); *Y02B 20/343* (2013.01)
USPC ........................................................ 345/102

(56) References Cited

U.S. PATENT DOCUMENTS

| | | | | |
|---|---|---|---|---|
| 8,115,422 | B2* | 2/2012 | Sasaki ............................ | 315/308 |
| 2006/0261752 | A1* | 11/2006 | Lee ................................ | 315/291 |
| 2007/0001625 | A1* | 1/2007 | Kim ................................ | 315/312 |
| 2007/0205812 | A1* | 9/2007 | Yamamoto et al. ........... | 327/108 |
| 2007/0273306 | A1 | 11/2007 | Fujino et al. | |
| 2008/0074348 | A1* | 3/2008 | Kao ................................. | 345/46 |
| 2008/0100234 | A1* | 5/2008 | Chen et al. ..................... | 315/312 |
| 2009/0207109 | A1* | 8/2009 | Wu et al. ........................ | 345/82 |
| 2011/0254454 | A1* | 10/2011 | Inoue et al. .................... | 315/161 |
| 2011/0260643 | A1* | 10/2011 | Huang et al. .................. | 315/294 |

FOREIGN PATENT DOCUMENTS

| | | |
|---|---|---|
| CN | 2884777 Y | 3/2007 |
| CN | 101517626 A | 8/2009 |
| CN | 101578003 A | 11/2009 |
| JP | 2011216663 A | 10/2011 |
| KR | 10-0952499 B1 | 4/2010 |

* cited by examiner

LED BACKLIGHT DRIVING CIRCUIT, BACKLIGHT MODULE, AND LCD DEVICE

TECHNICAL FIELD

The invention relates to the field of liquid crystal displays (LCDs), and more particularly to a light emitting diode (LED) backlight driving circuit, a backlight module, and an LCD device.

BACKGROUND

An LCD device includes an LCD panel and a backlight module. A boost circuit is often used in a conventional backlight driving circuit employing an LED as a backlight module. As shown in FIG. 1, when Q1 is turned on, L1 stores the energy; when Q1 is turned off, L1 releases the energy in a reverse direction, which makes an output voltage to be higher than an input voltage, and a current through the LEDs is kept constant by using a constant current module: a constant current is achieved by controlling an impedance of Q2, which enables a voltage of R1 to be equal to a reference voltage Vref. The relationship between the input voltage and the output voltage is:

Vo/Vin=1/(1−D), D is a ratio of a Q1 turn-on time to a cycle period.

After Vin is converted by DC/DC, and then is converted by the boost circuit, the efficiency is low.

SUMMARY

In view of the above-described problems, the aim of the invention is to provide an LED backlight driving circuit, a backlight module, and an LCD device capable of improving conversion efficiency and reducing the cost.

The aim of the invention is achieved by the following technical scheme.

An LED backlight driving circuit comprises an LED light string. An input end of the LED light string is directly connected with an input end of a power source, and an output end of the LED light string is coupled with a buck module.

Preferably, the buck module comprises a buck controllable switch for energy storage and a diode. One end of the buck controllable switch is connected with the input end of the power source, and the other end of the buck controllable switch is connected with an anode of the diode; a cathode of the diode is coupled with the output end of the LED light string. An energy storage capacitor is connected in series between the cathode of the diode and a ground terminal of the input end of the power source; and an energy storage inductor is connected in series between the anode of the diode and the ground terminal of the input end of the power source. This is a specific structure of the buck module.

Preferably, a filter capacitor is connected in series between the input end of the power source of the LED backlight driving circuit and the ground terminal. The filter capacitor can improve the quality of an input electric energy.

Preferably, the number of the light string is at least two, and the LED light strings are connected in parallel with each other. This is a circuit employing a plurality of LED light strings, which is suited to a large-screen LCD device.

Preferably, a dimming controllable switch is connected in series between the LED light string and the buck module, to adjust an effective current of a branch of an LED lightbar, so as to adjust LED brightness.

Preferably, a control end of the dimming controllable switch is connected with a constant current module.

Preferably, a divider resistor is connected in series between the dimming controllable switch and the buck module. On the one hand, the divider resistor can limit a short-circuit current when the LED light string is in short circuit condition; and on the other hand, a voltage difference between both ends of the resistor is used as a feedback voltage of controlling a constant current to be fed back to the constant current module which controls the dimming controllable switch.

Preferably, the constant current module comprises a comparator. One input end of the comparator is connected with a reference voltage, the other input end of the comparator is coupled between the dimming controllable switch and the divider resistor, and an output end of the comparator is coupled with the control end of the dimming controllable switch. This is a specific constant current control circuit.

A backlight module comprises the LED backlight driving circuit mentioned above.

An LCD device comprises the backlight module mentioned above.

In the invention, because the output end of the LED light string is in series connected with the buck module, the LED light string is connected in series between an input voltage and an output voltage, and a part of LEDs are directly supplied by the input voltage without the first stage conversion. Thus, an energy supplied by the buck module is reduced, the conversion efficiency is improved, and the energy efficiency is increased, the requirement of the buck module to withstand voltage is reduced, and the device standard is decreased, thereby favoring cost reduction.

DETAILED DESCRIPTION

The invention will further be described in detail in accordance with the figures and the preferable examples.

An LCD device comprises an LCD panel and a backlight module. The backlight module comprises an LED backlight driving circuit.

Figure 1:
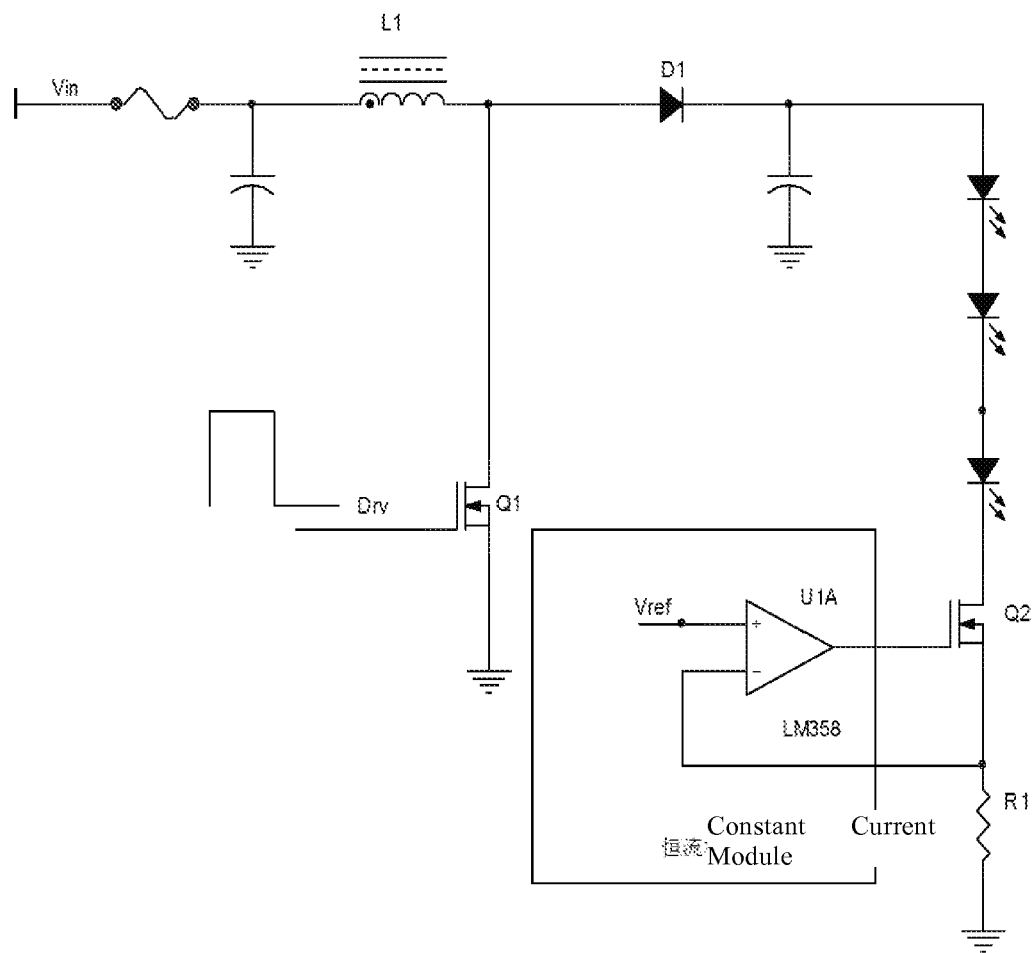
FIG. 1 is a schematic diagram of a conventional backlight driving circuit.
Figure 2:
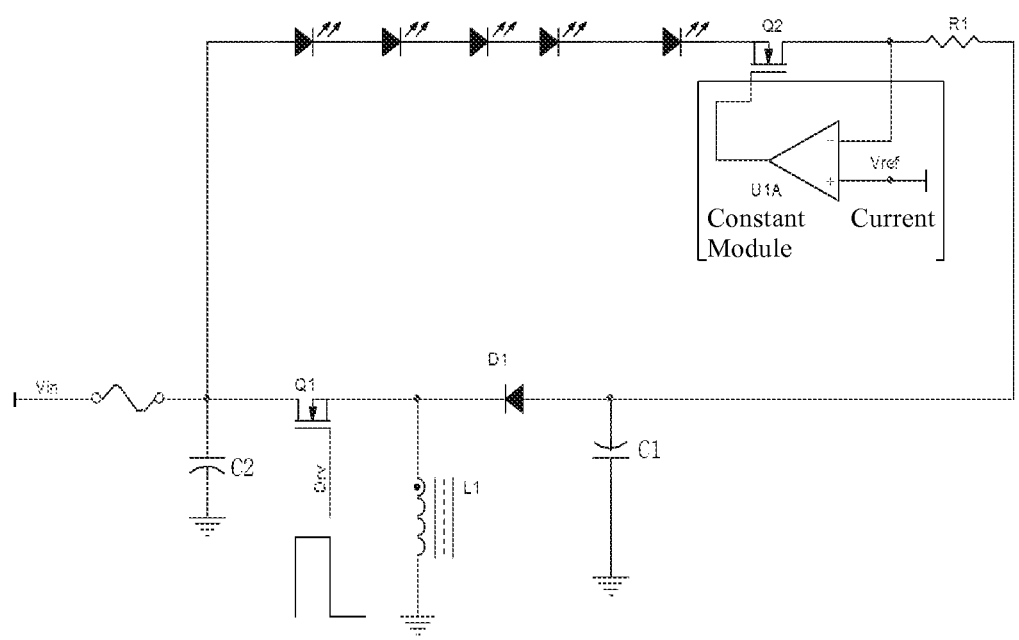
FIG. 2 is a schematic diagram of a circuit of an example of the invention.

As shown in FIG. 2, the LED backlight driving circuit of the invention comprises an LED light string; an output end of the LED light string is coupled with a buck module.

The buck module comprises a buck controllable switch for energy storage Q1 and a diode D1. One end of the buck controllable switch Q1 is connected with an input end of a power source Vin, and the other end of the buck controllable switch Q1 is connected with a cathode of the diode. An anode of the diode is coupled with the output end of the LED light string; an energy storage capacitor C1 is connected in series between the anode of the diode and a ground terminal of the input end of the power source; an energy storage inductor L1 is connected in series between the cathode of the diode and the ground terminal of the input end of the power source; and a filter capacitor C2 is connected in series between the input end of the power source of the LED backlight driving circuit and the ground terminal.

A dimming controllable switch Q2 and a divider resistor R1 are connected in series between the anode of the diode D1 and the output end of the LED light string. A control end of the dimming controllable switch Q2 is connected with a constant current module U1A, which comprises a comparator. One input end of the comparator is connected with a reference voltage Vref, the other input end of the comparator is coupled between the dimming controllable switch Q2 and the divider resistor R1, and an output end of the comparator is coupled with the control end of the dimming controllable switch Q2.

When the buck controllable switch Q1 is turned on, the energy is stored to the energy storage inductor L1, and the diode D1 is in a cut-off state, an upper end voltage of the energy storage inductor L1 is higher than a lower end voltage.

When the buck controllable switch Q1 is turned off, the upper end voltage of the energy storage inductor L1 is lower than the lower end voltage, which is opposite to a voltage direction of the energy storage inductor L1 when the buck controllable switch Q1 is turned on. And the L1 releases the energy, the D1 is in a turn-on state, the voltage of the output end of the LED light string is reduced. Because the output end of the LED light string is connected with the output end of the power source, the voltage of the LED light string is kept constant. Thus, after the voltage of the output end of the LED light string is reduced, a voltage difference between both ends of the LED light string is increased, which can drive the LED light string to normally emit light.

In the aspect of constant current control, the dimming controllable switch Q2 is controlled, and the effective current of a branch is adjusted. Thus, the voltage of the divider resistor R1 is equal to the reference voltage Vref, which achieves a constant current.

The invention can be applied to a circuit with a single LED light string, and can be applied to a circuit with a plurality of LED light strings as well. To the circuit with a plurality of LED light strings, the light strings are connected in parallel with each other, and the output ends of the light strings are uniformly coupled with the buck module.

In the invention, because the output end of the LED light string is in series connection with the buck module, the LED light string is connected in series between an input voltage and an output voltage, and a part of LEDs are directly supplied by the input voltage without the first stage conversion. Thus, the energy supplied by the buck module is reduced, the conversion efficiency is improved, the energy efficiency is increased, the requirement of the buck module to withstand voltage is reduced, and the device standard is decreased, thereby favoring cost reduction.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. An LED backlight driving circuit, comprising: an input end of a power source electrically connected to one end of an energy storage inductor via two branches, wherein one branch comprises an LED light string and a diode, the other branch comprises a buck controllable switch, and the other end of the energy storage inductor is directly and always grounded, one end of said buck controllable switch is connected with said input end of said power source, and the other end of said buck controllable switch is connected with one end of the energy storage inductor; an anode of said diode is coupled with said output end of said LED light string; a cathode of said diode is electrically connected to one end of the energy storage inductor; an energy storage capacitor is connected in series between said cathode of said diode and a ground terminal of said input end of said power source; and the other end of the energy storage inductor is grounded.

2. The LED backlight driving circuit of claim 1, wherein a filter capacitor is connected in series between said input end of said power source of said LED backlight driving circuit and a ground terminal.

3. The LED backlight driving circuit of claim 1, wherein the number of said light string is at least two, and said light strings are connected in parallel with each other.

4. The LED backlight driving circuit of claim 1, wherein a dimming controllable switch is connected in series between said LED light string and said diode.

5. The LED backlight driving circuit of claim 4, wherein a control end of said dimming controllable switch is connected with a constant current module.

6. The LED backlight driving circuit of claim 5, wherein a divider resistor is connected in series between said dimming controllable switch and said diode.

7. The LED backlight driving circuit of claim 6, wherein said constant current module comprises a comparator; one input end of said comparator is connected with a reference voltage, the other input end of said comparator is coupled between said dimming controllable switch and said divider resistor, and an output end of said comparator is coupled with said control end of said dimming controllable switch.

8. A backlight module, comprising: an LED backlight driving circuit; wherein said LED backlight driving circuit comprises an input end of a power source electrically connected to one end of an energy storage inductor via two branches, wherein one branch comprises an LED light string and a diode, the other branch comprises a buck controllable switch, and the other end of the energy storage inductor is directly and always grounded, and one end of said buck controllable switch is connected with said input end of said power source, and the other end of said buck controllable switch is connected with one end of the energy storage inductor; an anode of said diode is coupled with said output end of said LED light string; a cathode of said diode is electrically connected to one end of the energy storage inductor; an energy storage capacitor is connected in series between said cathode of said diode and a ground terminal of said input end of said power source; and the other end of the energy storage inductor is grounded.

9. The backlight module of claim 8, wherein a filter capacitor is connected in series between said input end of said power source of said LED backlight driving circuit and a ground terminal.

10. The backlight module of claim 8, wherein the number of said light string is at least two, and light strings are connected in parallel with each other.

11. The backlight module of claim 8, wherein a dimming controllable switch is connected in series between said LED light string and said diode.

12. The backlight module of claim 11, wherein a control end of said dimming controllable switch is connected with a constant current module.

13. The backlight module of claim 12, wherein a divider resistor is further connected in series between said dimming controllable switch and said diode.

14. The backlight module of claim 13, wherein said constant current module comprises a comparator; one input end of said comparator is connected with a reference voltage, the other input end of said comparator is coupled between said dimming controllable switch and said divider resistor, and an output end of said comparator is coupled with said control end of said dimming controllable switch.

15. An LCD device, comprising: a backlight module having an LED backlight driving circuit; wherein said LED backlight driving circuit comprises an input end of a power source electrically connected to one end of an energy storage inductor via two branches, wherein one branch comprises an LED light string and a diode, the other branch comprises a buck controllable switch, and the other end of the energy storage inductor is directly and always grounded, and one end of said buck controllable switch is connected with said input end of said power source, and the other end of said buck controllable switch is connected with one end of the energy storage inductor; an anode of said diode is coupled with said output end of said LED light string; a cathode of said diode is electrically connected to one end of the energy storage inductor; an energy storage capacitor is connected in series between said cathode of said diode and a ground terminal of said input end of said power source; and the other end of the energy storage inductor is grounded.

* * * * *